UNITED STATES PATENT OFFICE.

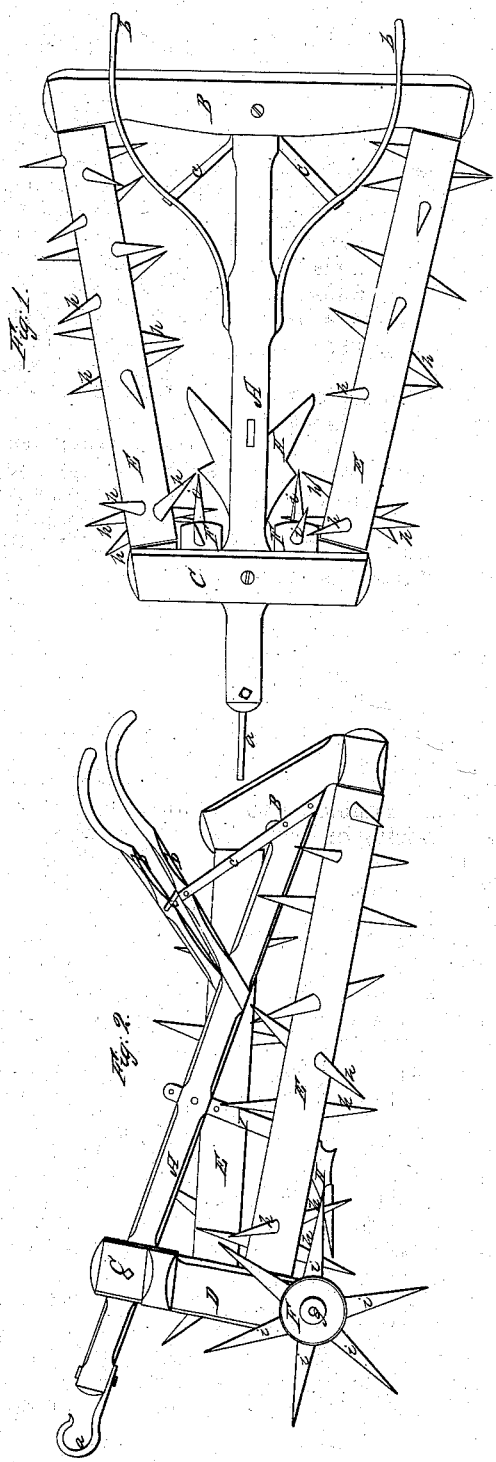

DANIEL C. COLBY, OF CLAREMONT, NEW HAMPSHIRE.

IMPROVEMENT IN CULTIVATORS.

Specification forming part of Letters Patent No. 36,895, dated November 11, 1862.

*To all whom it may concern:*

Be it known that I, DANIEL C. COLBY, of Claremont, in the county of Sullivan, State of New Hampshire, have invented new and useful Improvements in an Agricultural Implement, which I denominate a "Horse-Hoe; and I do hereby declare that the following is a full and exact description of the construction and mode of operating the same, reference being had to the annexed drawings, making a part of this specification.

Figure 1 is a view of the machine, looking down upon it from the rear. Fig. 2 is a side view of the same.

The same letters in the different figures of drawings represent corresponding parts of the machine.

The central beam, A, the cross-beams B and C, and the stirrups D D constitute the main frame-work of the implement.

F F are toothed wheels, placed either upon the outside or inside, as may be desired, of the stirrups D D, and rotate upon the journals *g g* as the machine is moved forward.

E E are toothed rollers, kept in rotation by the action of the teeth in the wheels upon the teeth in the front ends of these rollers.

H is a double plowshare, adjustable as to the depth it cuts the soil by raising or lowering its shaft I.

*a* is the draft-hook; *b b*, the handles; *c*, the rod connecting them; *e e*, braces to steady the handles; *g g*, journals on which the wheels F F turn; *i i i*, &c., the teeth of these wheels; *h h h*, &c., are the teeth in the rollers. These teeth should be of wrought-iron, and of such size as the nature of the work they are expected to perform may require, the central portions of the wheels F F being of cast-iron or other suitable material.

With the machine arranged as in Fig. 1 the wheels F F will be seen placed on the inside of the stirrups D D, so as the machine is moved forward the rollers E E will rotate inward. This is the especial arrangement when the plants are just beginning to appear above ground and no hilling is required.

In Fig. 2 the wheels F F will be seen upon the outside of the stirrups D D. By this arrangement the rollers are made to rotate outward, this being the method of combining the parts when the plants have acquired more or less growth and the farmer wishes to throw up earth around them. The length of the cross-beam C is merely sufficient to allow room for the wheels F F when arranged as in Fig. 1

The plow H is placed in the peculiar relation to the front teeth of the rollers E E in order that the said teeth (as the rollers revolve) may pass over and near to the surface of the two wings of the said plow, and thus clear them from clogging, and at the same time to act upon the turf and clay lumps to break and fine them.

Having thus described the construction and methods of arranging the several parts of my horse-hoe, I now proceed to set forth its advantages and operation.

It will be readily admitted that a machine adapted not only to the various kinds of crops, but also to the different stages of their growth and the variety of soil, is very desirable. When a complete pulverization and thorough weeding of the soil are required without hilling, my hoe, arranged as in Fig. 1, is triumphantly successful, for thus the soil thrown up by the plow H is thoroughly stirred and pulverized by the many teeth in the rollers E E, and cut so fine as to eradicate the grass and weeds, leaving them upon the surface to die.

Later in the season the machine may be arranged as in Fig. 2 and the plowshare lowered more or less, according as one wishes to hill up much or little. The soil now lifted from between the rows by the plow H is seized hold of by the teeth of the rollers E E, pulverized, and thrown up around and in among the growing crops to give off its nutrition to the plants in their now fructifying and larger growth, leaving the hills or rows with all that nice finish which farmers who still cultivate with the hand-hoe so much desire to produce.

The change of parts by which the varied results of my hoe is produced is of the simplest character, and the adaptedness to hill up none at all, slightly, or to a greater extent will commend itself to all farmers, for it responds to every theory of cultivation and to all kinds of soil. The perfect pulverization of and thorough admixture of the manures with the soil in the summer months, after the solidifying spring rains, are advantages not easily over-estimated.

To secure a farm implement that shall answer the above requirements in the best possible manner is the object of my invention.

I do not claim the use of toothed rollers, broadly, nor do I claim rotating them by a driving wheel or wheels; but What I do claim, and desire to secure by Letters Patent, is—

1. The arrangement and combination of the rollers E E, the wheels F F, and the stirrups D D, substantially as described, and for the purposes set forth.

2. The arrangement of the plow H with relation to the front teeth of the rollers E E, in the manner and for the purposes set forth.

DANIEL C. COLBY.

Witnesses:
J. F. LADUAR,
CHARLES L. PERRY.